May 17, 1949.   J. NADER   2,470,408
FRAME FOR DYNAMOELECTRIC MACHINES
Filed March 12, 1947
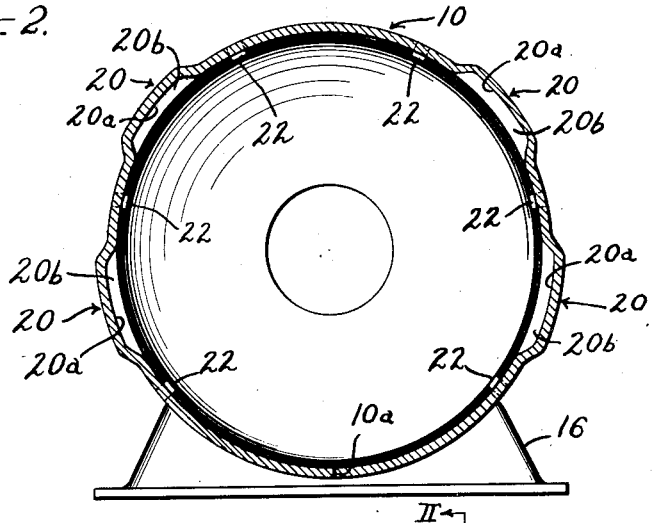
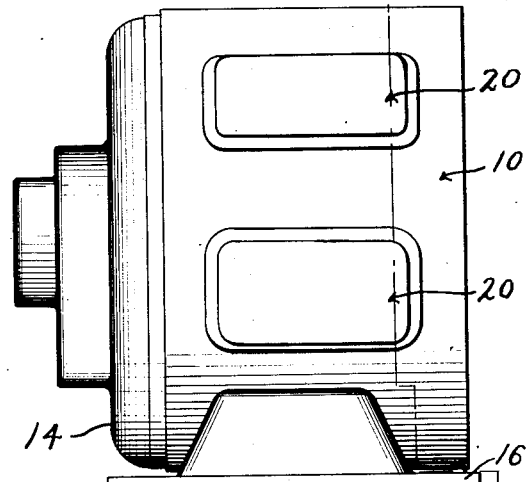
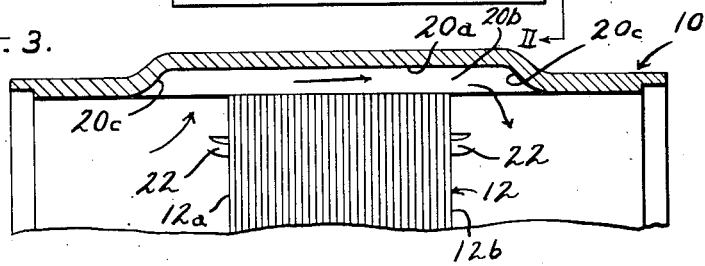
Inventor
JOSEPH NADER
by The Firm of Charles W. Hills  Attys.

Patented May 17, 1949

2,470,408

UNITED STATES PATENT OFFICE 2,470,408

FRAME FOR DYNAMOELECTRIC MACHINES

Joseph Nader, Glen Ellyn, Ill., assignor to Nader Engineering Company, Chicago, Ill., a corporation of Illinois Application March 12, 1947, Serial No. 734,272

4 Claims. (Cl. 171—252)

This invention relates to dynamoelectric machines, and particularly to an improved frame construction for such machines.

In a copending application of Raymond O. Watkins, Serial No. 712,997, filed November 29, 1946, and assigned to the assignee of this application, there is disclosed a desirable frame construction for dynamoelectric machines and method of fabrication and assembly of such frame structure wherein the frame member is initially formed from a sheet metal strip which is wrapped around the stack of magnetic laminations of the dynamoelectric machine and in which are provided a plurality of inwardly directed indentations for engaging the magnetic stack and thus supporting the remainder of the frame member in outwardly spaced relationship with respect to the stack to define axially extending passages for cooling air flow therebetween.

This invention also relates to a frame construction for a dynamoelectric machine wherein the frame member may be fabricated from sheet metal and assembled according to the methods disclosed in the above identified Watkins application, but embodies an improved frame construction by which the efficiency of the cooling action by the air flow through the frame is substantially increased, yet the overall dimensions and weight of the frame and the manufacturing cost of any dynamoelectric machine utilizing such frame are substantially reduced.

A feature of this invention is the formation of the frame of a dynamoelectric machine from a metal strip which is wrapped around and secured to the magnetic structure of such machine. A frame member according to this invention is provided with outwardly directed indentations or protuberances which extend axially beyond both end faces of the magnetic structure, but terminate short of the edges of the frame. With such construction, axially extending channels are provided between the magnetic structure and the frame member for cooling air flow; however, the diametrical dimension of the main portion of the frame is reduced to the minimum dimensions required to permit the frame member to be wrapped around the magnetic structure. Furthermore, such reduction in dimensions may also be applied to the end bells or casings which are assembled in conventional manner to the end faces of the frame member. Such size reduction results in a substantial reduction in manufacturing cost of the dynamoelectric machine as well as the total weight of such machine.

A further important feature of this invention lies in the shaping of the inner surfaces of the junction of the protuberance portions with the main body portion of the frame in such manner as to produce a most desirable path of cooling air flow through the dynamoelectric machine. It is well known in this art that maximum air flow cooling effect on a dynamoelectric machine is produced by the directing of an air flow through the end turns of the winding disposed in the stationary magnetic structure of the machine. Heretofore, and particularly with frame constructions of the type disclosed in the above identified Watkins application, it was necessary to provide air flow baffle members within the frame structure to direct the air flow therethrough in such manner as to insure that a substantial quantity of the air passes through the end turns of the winding disposed in the stationary magnetic structure. In accordance with this invention, the junction surfaces between the protuberances and the main body portion of the frame are shaped so as to promote air flow in generally radial paths past the end faces of the stationary magnetic structure and along axial paths around the periphery of the magnetic structure. It is thus assured that a substantial air flow through the end turns of the windings in the magnetic structure is produced without requiring the expense and inconvenience of additional baffle members within the frame.

Accordingly, it is an object of this invention to provide an improved frame construction for a dynamoelectric machine.

Another object of this invention is to provide a frame construction for a dynamoelectric machine which may be manufactured and assembled by low cost, high production processes such as stamping, bending, and welding operations.

A further object of this invention is to provide an improved frame for a dynamoelectric machine which will provide axially extending passages for cooling air flow past the magnetic structure of the dynamoelectric machine but which will not increase the overall dimensions of most of the frame beyond that necessarily required to surround the magnetic structure.

A particular object of this invention is to provide a sheet metal frame for a dynamoelectric machine wherein outwardly directed protuberances in such frame provide axially extending passages for cooling air flow along the periphery of the magnetic structure and the inner junction surfaces of the protuberance and the main portion of the frame are shaped so as to induce a cooling air flow along substantially radial paths across both end faces of the magnetic structure, thereby producing a substantial flow of cooling air through the end turns of the winding disposed in such magnetic structure without requiring separate air baffle or guide members within the frame.

The specific nature of this invention as well as other objects and advantages thereof will become apparent to those skilled in the art from the following detailed description of the annexed sheet of drawings which, by way of preferred example only, illustrate one specific embodiment of the invention.

On the drawings:

Figure 1 is a side elevational view of a frame for a dynamoelectric machine constructed in accordance with this invention, showing the frame in assembly with one end bell.

Figure 2 is a sectional view taken on the plane II—II of Figure 1.

Figure 3 is a partial sectional view taken along a diametral plane through the frame member and illustrating the cooperation of the frame member with a laminated magnetic structure of the dynamoelectric machine.

As shown on the drawings:

A frame construction for a dynamoelectric machine embodying this invention is indicated by the numeral 10 on the drawings and comprises a generally cylindrical, annular member. The bore diameter of the frame 10 is selected so as to permit the frame to snugly engage the periphery of a magnetic structure 12 which conventionally comprises a stack of magnetic laminations. An end bell or casing 14 is secured in any conventional manner to each of the cylindrical end faces 10a of the frame 10. A support bracket 16 may be secured to the exterior of frame 10 in any suitable manner, such as by welding.

At spaced intervals around the periphery of frame 10, a portion of the frame is deformed outwardly to produce a plurality of protuberances or indentations 20. The protuberances 20 are outwardly deformed to a sufficient extent to space the inner surfaces 20a thereof a substantial distance outwardly from the periphery of the magnetic structure 14. Furthermore, as best shown in Figure 3, the protuberances 20 extend a substantial distance axially past each end face 12a and 12b of the magnetic structure 12. Hence each of the protuberances 20 defines an axially extending passage 20b between its inner surface and the adjacent periphery of the magnetic structure 12 to accommodate flow of cooling air through the frame member 10. It will of course be understood by those skilled in the art that any conventional form of fan or impeller (not shown) is provided within the frame member 10 and operable by the moving element of the dynamoelectric machine to produce a generally axially directed flow of cooling air through the frame 10.

It will be noted that at each of the axially spaced edges of the protuberance 20 there is defined within a frame 10 a pair of opposed, facing junction surfaces 20c (Figure 3). In accordance with this invention, the junction surfaces 20c are shaped in such manner as to facilitate the production of air flow across the end faces of the magnetic structure 12 along substantially radial paths as indicated by the arrows. This may be conveniently accomplished by forming junction surfaces 20c as reversely curved arcuate surfaces. In accordance with conventional practice, the end turns of the winding coils (not shown) carried by the magnetic structure 12 will project axially beyond the end faces 12a and 12b and hence will be disposed within the path of the radial component of cooling air flow induced by the junction surfaces 20c. Therefore a substantial cooling effect may be exerted upon such end coils without requiring additional air baffle members within the frame 10, as has heretofore been necessary.

While the magnetic structure 12 may be locked in assembly in frame 10 by any one of several well known arrangements, I preferably employ a plurality of integrally formed, inwardly projecting tongues 22 which may be formed by a stamping operation on those portions of the frame 10 lying intermediate the protuberances 20. Two axially spaced ring-like arrangements of such tongues 22 are provided, respectively disposed on each side of the magnetic structure 12 and snugly engaging the end faces 12a and 12b thereof.

The manufacture and assembly of frame 10 may then be conveniently accomplished according to the methods of the above identified Watkins application. That is, the frame 10 is formed from an initially flat strip of sheet metal and stamping operations are employed upon the flat strip to produce the protuberances 20 and the projections 22. The strip is then rolled or wrapped around a suitable mandrel to form a split ring and the magnetic structure 12 is then inserted within the frame 10 and positioned between the projections 22. The ends of the frame ring are then drawn together in juxtaposition and rigidly secured in any convenient manner, such as by welding, indicated at 10a of the drawings. As a result, the magnetic structure 12 is rigidly secured within the frame 10 and locked against radial or axial displacement.

From the foregoing description, it is apparent that this invention provides a frame construction which is unusually economical to manufacture, inasmuch as it not only is completely fabricated and assembled by low cost, high production methods, but furthermore, since the major portion of the frame and the end bells are of minimum possible dimensions for the size of the magnetic structure, a substantial saving in materials is also effected. Furthermore, the action of the junction surfaces 20c in producing radial components of air flow past both end faces of the magnetic structure increases the overall cooling efficiency of the dynamoelectric machine and permits the machine to be operated at a higher rating without requiring any additional apparatus.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a dynamoelectric machine, a magnetic structure, a sheet metal frame member surrounding said magnetic structure, said frame member having a plurality of integrally stamped, outwardly directed indentations spaced around the periphery thereof and outwardly spaced from the periphery of the magnetic member, said indentations extending axially beyond both end faces of the magnetic structure but terminating short of the edges of the frame, thereby defining a plurality of axially extending passages between said frame and the magnetic structure for cooling air flow.

2. In a dynamoelectric machine, a stack of magnetic laminations having a generally cylindrical configuration, a sheet metal frame member wrapped snugly around the periphery of said stack, said frame member having a plurality of integrally stamped, outwardly directed indentations spaced around the periphery thereof and the inner surfaces of said indentations being outwardly spaced from the periphery of the magnetic member, said indentations extending axially beyond both end faces of the magnetic structure but terminating short of the edges of the frame, thereby defining a plurality of axially extending passages between said frame and the magnetic structure for cooling air flow.

3. In a dynamoelectric machine, a magnetic structure having a generally cylindrical exterior surface, a sheet metal frame member surrounding said magnetic structure and having portions thereof snugly engaging the cylindrical periphery of the magnetic structure, said frame member having an integrally stamped outwardly projecting protuberance which has its inner surface spaced outwardly from the periphery of the magnetic structure, said protuberance extending axially beyond both end faces of the magnetic structure, thereby defining an axially extending passage between said frame and the magnetic structure for cooling air flow, said protuberance terminating short of the edges of the frame to define on the inside of said frame member a pair of opposed, facing, junction surfaces, said junction surfaces having a reversely bent configuration constructed and arranged to guide the air flow within said frame member in a generally radial path past the end faces of said magnetic structure and axially along the periphery of said magnetic structure through said passage.

4. In a dynamoelectric machine, a magnetic structure having a generally cylindrical exterior, a sheet metal frame member surrounding said magnetic structure and snugly engaging the periphery thereof, said frame member having a plurality of integrally stamped, peripherally spaced, outwardly projecting protuberances, said protuberances having inner surfaces spaced outwardly from the periphery of the magnetic member and extending axially beyond both end faces of the magnetic structure, thereby defining a plurality of axially extending passages between said frame member and the magnetic structure for cooling air flow, each of said protuberances terminating short of the edges of the frame to define on the inside of said frame a pair of opposed, facing, junction surfaces, said junction surfaces each having a reversely curved, arcuate configuration constructed and arranged to guide the air flow within said frame in generally radial paths past the end frame of said magnetic structure and axially along the periphery of said magnetic structure through said passages.

JOSEPH NADER.

REFERENCES CITED

The following references are of record in the file of this patent:

UNITED STATES PATENTS

| Number | Name | Date |
| --- | --- | --- |
| 1,300,373 | Garcelon | Apr. 15, 1919 |
| 1,816,859 | Linders | Aug. 4, 1931 |
| 1,866,368 | Oldenburg | July 5, 1932 |
| 2,295,203 | Darnell | Sept. 8, 1942 |
| 2,394,517 | Ingalls | Feb. 5, 1946 |

FOREIGN PATENTS

| Number | Country | Date |
| --- | --- | --- |
| 98,633 | Austria | Nov. 25, 1924 |
| 582,891 | France | Oct. 22, 1924 |